United States Patent [19]

Kreil et al.

[11] Patent Number: 4,594,262
[45] Date of Patent: Jun. 10, 1986

[54] ELECTRON BEAM ADHESION-PROMOTING TREATMENT OF POLYESTER FILM BASE

[75] Inventors: Curtis L. Kreil, St. Paul; LuAnn Sidney, White Bear Township, Ramsey County, both of Minn.

[73] Assignee: Minnesota Mining and Manufacturing Company, St. Paul, Minn.

[21] Appl. No.: 745,812

[22] Filed: Jun. 17, 1985

Related U.S. Application Data

[63] Continuation of Ser. No. 627,812, Jul. 5, 1984, abandoned.

[51] Int. Cl.[4] .............................................. B05D 3/06
[52] U.S. Cl. ............................................ 427/44; 427/35
[58] Field of Search ................ 427/35, 44; 204/159.19

[56] References Cited

U.S. PATENT DOCUMENTS

| | | | |
|---|---|---|---|
| 2,863,812 | 12/1958 | Graham | 204/159.19 |
| 2,940,869 | 7/1960 | Graham | 204/159.19 |
| 2,951,024 | 8/1960 | D'Alelio | 204/159.19 |
| 2,955,953 | 10/1960 | Graham | 204/159.19 |
| 2,997,419 | 8/1961 | Lawton | 204/159.19 |
| 3,188,229 | 6/1965 | Graham | 204/159.19 |
| 3,188,266 | 6/1965 | Charbonneau et al. | 161/188 |
| 3,284,331 | 11/1966 | McBride et al. | 204/165 |
| 3,607,354 | 9/1971 | Krogh et al. | 117/47 |
| 3,628,987 | 12/1971 | Nakata et al. | 427/208.8 |
| 3,715,334 | 2/1973 | Karstedt | 260/46.5 |
| 3,783,004 | 1/1974 | Parker | 204/159.19 |
| 4,092,173 | 5/1978 | Novak et al. | 204/159.19 |
| 4,128,426 | 12/1978 | Ohta | 427/40 |
| 4,140,607 | 2/1979 | Kreiselmeier et al. | 204/168 |
| 4,190,623 | 2/1980 | Bobeth et al. | 204/159.19 |
| 4,210,703 | 7/1980 | Scantlin et al. | 428/130 |
| 4,267,202 | 5/1981 | Nakayama et al. | 427/40 |
| 4,386,135 | 5/1983 | Campbell et al. | 428/447 |

FOREIGN PATENT DOCUMENTS

| | | |
|---|---|---|
| 57-84115 | 5/1982 | Japan . |
| 58-141214 | 8/1983 | Japan . |
| WO82/01099 | 4/1982 | PCT Int'l Appl. . |
| 2055877 | 3/1981 | United Kingdom . |
| 2057471 | 4/1981 | United Kingdom . |

OTHER PUBLICATIONS

Lee et al., Handbook of Epoxy Resins, McGraw Hill, N.Y., ©1967, p. 1–2.
Briggs, D., et al., "Surface Modification of Poly(ethylene terephthalate) by Electrical Discharge Treatment", Polymer, Aug. 1980, pp. 895–900.
Rand, W. M., Jr., "Electron Curing of Magnetic Coatings", Radiation Curing, Feb. 1983, pp. 26–31.
Th. Goldschmidt, AG Trade Literature.

Primary Examiner—Richard Bueker
Attorney, Agent, or Firm—D. M. Sell; J. A. Smith; D. B. Little

[57] ABSTRACT

Organic coatings adhere better to polyester film base if the film base is first subjected to electron-beam irradiation while passing through an inert atmosphere such as nitrogen.

22 Claims, 2 Drawing Figures

ELECTRON BEAM ADHESION-PROMOTING TREATMENT OF POLYESTER FILM BASE

This is a continuation of application Ser. No. 627,812 filed July 5, 1984, now abandoned.

FIELD OF THE INVENTION

The invention concerns an adhesion-promoting treatment to enhance the adhesion of organic coatings to a polyester film base. By "polyester film base" is meant (1) biaxially-oriented poly(ethylene terephthalate) film obtained from ethylene glycol and dimethyl terephthalate or terephthalic acid and (2) biaxially-oriented films of related polyesters.

CROSS-REFERENCE TO RELATED APPLICATIONS

This applicatin is closely related to two applications; both filed July 5, 1974, one entitled "Electron-Beam Adhesion-Promoting Treatment of Polyester Film Base for Silicone Release Liners" Ser. No. 628,153; now U.S. Pat. No. 4,533,566, and the other entitled "Electron-Beam Adhesion-Promoting Treatment of Polyester Film Base for Magnetic Recording Media" Ser. No. 628,154, now U.S. Pat. No. 4,543,268.

BACKGROUND ART

Biaxially-oriented poly(ethylene terephthalate) film base has a great many uses because it is rather inexpensive and yet is strong, tough, dimensionally-stable, and resistant to heat. However, most coatings do not adhere well unless the polyester film base first receives an adhesion-promoting treatment. There are a variety of such treatments, but for some coatings, no known treatment is fully effective.

Because of its low cost, a leading treatment is corona discharge even though it is only partially effective. Furthermore, because corona discharge treatment is transitory, any coating must be promptly applied to the treated polyester film base. Corona discharge treatment of poly(ethylene terephthalate) film is discussed in an article by Briggs et al.: "Surface Modification of Poly(ethylene Terephthalate) by Electrical Discharge Treatment", *Polymer*, 1980, Vol. 21, August, pages 895–900.

Where better adhesion is demanded, the polyester film base may be chemically treated, such as with parachlorophenol as in U.S. Pat. No. 3,607,354, even though this involves a toxicity hazard. Organic priming or subbing coatings which are less toxic can also significantly enhance adhesion, and can be better adhered to the film base by subjecting the coating to ultraviolet irradiation as taught in U.S. Pat. Nos. 3,188,266 (Charbonneau et al.) and 4,210,703 (Scantlin et al.). Other adhesion-promoting treatments for polyester film base include spark and other electrical discharges, flame, and physical and/or chemical etching.

U.S. Pat. No. 2,955,953 (Graham) concerns promoting adhesion to any solid organic polymeric substrate by subjecting it in the substantial absence of oxygen to charged particle ionizing radiation having an energy of from 15 to 50,000 electron volts. The accelerated particles may be utilized in a vacuum or pass through a window and be utilized in air or a gas. In the Example, cellophane was irradiated in a cathode ray tube, and only the face of the film exposed to the electron beam exhibited the desired improvement in adhesion. The Graham patent suggests that not more than five minutes should elapse before a coating is applied unless the irradiated substrate "is kept in an inert atmosphere such as under nitrogen, argon, helium or the like and/or is stored at a low temperature such as at −80° C." (column 2, lines 1–6).

Japanese patent application JA55-160598 (Takada et al.) which was laid open May 26, 1982 concerns the application by vacuum deposition of a magnetizable thin film such as Co/Ni to polyester film. Immediately before applying the magnetizable thin film, the polyester film base is placed in a poly(ethylene terephthalate) tube or bag and subjected to electron-beam radiation having an energy of 2.5 Mev (Examples 1 and 2). Although none of the examples give other conditions of the preirradiation, the final paragraph of the application states that the preirradiation may be conducted in a vacuum container, followed immediately by deposition of the magnetizable thin film to keep the surface of the film base free from moisture and dust. By doing so, the Co/Ni or other magnetizable film is said to adhere better to the polyester film base. See also the claim and the penultimate paragraph immediately preceding Example 1.

It is believed that any known adhesion-promoting treatment of polyester film base which is signficantly more effective than corona discharge also is significantly more expensive or involves hazards or both. Accordingly, the need has continued for a more effective treatment at a cost closer to that of corona discharge.

It is difficult to quantify the effectiveness of a treatment for promoting the adhesion of a coating to polyester film base. One test involves adhering the coating to an article to create a bond between the coating and article which is stronger than the bond between the coating and the film base. The force required to peel apart the film base and the article at 180° is recorded as a measure of how well the coating is adhered. Although peel adhesion is meaningful, it may not precisely indicate the resistance of the coating layer to being removed when rubbed, such as when a magnetic recording layer is drawn across a magnetic recording head. A better indication of adequate adhesion to resist rubbing or abrasion failure has been obtained by testing the resistance of a coating to removal upon being scratched with one's fingernail or rubbed with one's thumb. The edge of a razor blade pressed vertically across a relatively moving coating can also provide a good indication of the resistance of the coating to removal when subjected to the sort of rubbing it may encounter in use.

OTHER PRIOR ART

Some silicons which can be used for release liners can be cured by electron-beam irradiation. Among such silicones are the RC series of "TEGO" silicone acrylates sold by Th. Goldschmidt AG of Essen, West Germany. Its trade literature suggests polyester among suitable substrates. However, experiments show that electron-beam curing of a coating of one of these silicones on a polyester film base would not enhance the adhesion of the silicon coating to the film base. Electron-beam irradiation can also be used in the manufacture of magnetic recording media to cure the binder of a magnetizable layer. See, for example, U.K. patent application Nos. GB 2,057,471A and GB 2,055,877A of Sony Corp. and PCT patent application PCT/US81/02176 of Ampex Corp. The Sony applications employ a polyester film base, while no mention has been found in the Ampex application of the identity of the nonmagnetic substrate of its medium. However, experiments suggest that electron-beam curing would not enhance the adhesion of an organic coating to an underlying polyester film base.

DISCLOSURE OF INVENTION

The present invention concerns an adhesion-promoting treatment of polyester film base which is free from toxic hazards, can be applied at a cost close to that of corona discharge treatment, and is believed to be at least as effective as is any presently commercial adhesion-promoting treatment. The invention is believed to provide the only adhesion-promoting treatment for polyester film base that can simultaneously enhance adhesion of organic coatings to both faces of the film base even though directed toward only one of its faces.

The adhesion-promoting treatment of the invention involves the steps of (1) continuously passing uncoated polyester film base through an inert atmosphere while (2) exposing the film base to irradiation by an electron beam to subject the film base to an absorbed dosage of at least 0.5 Mrad, thus promoting the adhesion of an organic coating to at least the face of the film base that faces the electron-beam radiation. The term "uncoated" refers at least to that face of the polyester film base to which said organic coating is to be applied. By "inert atmosphere" is meant an environment comprising flue gas, nitrogen, or a gas of Group O of the Periodic Table and containing no more oxygen than 100 parts per million. A preferred inert atmosphere is nitrogen. Argon has been shown to be equally useful in practicing the present invention.

Tests indicate that the effectiveness of the adhesion-promoting treatment of the invention does not change during prolonged storage, so that an organic coating may be applied to an adhesion-promoted surface either immediately or after prolonged storage in air at ordinary room temperatures, with equivalent results. Such tests have involved delays of several months.

For treating polyester film base having a thickness range from 25 to 250 micrometers, the electron beam preferably has an accelerating voltage of at least 150 keV, more preferably at least 200 keV. Thinner polyester film base may be effectively treated at lower accelerating voltages, while thicker polyester film base may require higher accelerating voltages to enhance the adhesion of organic coatings to both of its faces.

Optimum results have been obtained at dosages between 1 and 20 Mrad. Below 1 Mrad, the novel adhesion-promoting treatment would be marginally effective. Dosages above 10 Mrad produce little, if any, advantage as compared to lower dosages and also involve the hazard of possibly overheating the film base. This hazard may be reduced by irradiating the film base while in contact with a water-cooled chill roll, but when doing so, adhesion only to the noncontacting face of the film base may be satisfactorily enhanced.

Except when a surface of a polyester film base contacts a metal roll during the adhesion-promoting treatment of the invention, the treatment improves the adhesion of organic coatings to both faces of the film base except possibly at low accelerating voltages.

Tests to date indicate that the oxygen content of the inert atmosphere should be as low as possible. Excellent adhesion of an organic coating has been realized when the oxygen level of the inert atmosphere was between 10 and 40 parts per million, and the best results have been obtained at the lowest oxygen levels. At the present time it may be unduly expensive to attempt to operate at levels substantially below 5 parts per million.

For economy, the adhesion-promoting treatment of the invention preferably is carried out at approximately atmospheric pressure and at web speeds of at least 50 meters per minute. Below 30 meters per minute might be too slow to be commercially feasible.

Because poly(ethylene terephthalate) is believed to be the only presently commercial polyester film base, it has been used in all work on the invention, but equivalent polyester film base should experience the same results.

The invention should be especially useful in the manufacture of (1) flexible magnetic recording media, (2) pressure-sensitive adhesive tapes, (3) silicone release liners for pressure-sensitive adhesive tapes, (4) abrasive sheeting, (5) photographic, X-ray, and other imaging sheeting, (6) decorative marking films, and (7) retroreflective sheeting. In magnetic recording media and abrasive sheeting, the adhesion-promoting treatment can be used both to enhance the adhesion of a functional coating and also to enhance the adhesion of a backside coating such as is often employed for such purposes as providing increased drive friction or bleeding off static charges. While capital equipment for the novel adhesion-promoting treatment would be far more expensive than is corona discharge equipment, operating costs should be comparable, and the huge size of potential markets should reduce capital costs to a small fraction of operating costs.

Figure 1:
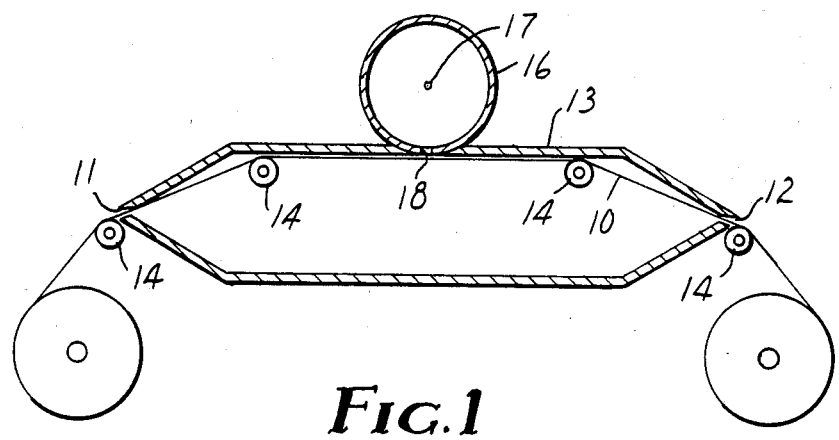
FIG. 1 schematically illustrates apparatus for applying to polyester film base the adhesion-promoting treatment of the invention.

The apparatus shown in FIG. 1 is schematically illustrated in greater detail in "Radiation Curing", February 1983, page 30. An essentially identical apparatus is schematically illustrated in "Adhesives Age", December 1982, page 28.

In FIG. 1 of the present drawing, a polyester film base 10 is guided by idler rolls 14 through narrow slits 11 and 12 of a chamber 13. The slits serve as exhausts for nitrogen being pumped into the chamber. Mounted over a metallic foil window 18 of the chamber 13 is a vacuum chamber 16 containing a linear filament electron source 17. After being irradiated through the window 18, the film base 10 is wound upon itself into a roll.

Figure 2:
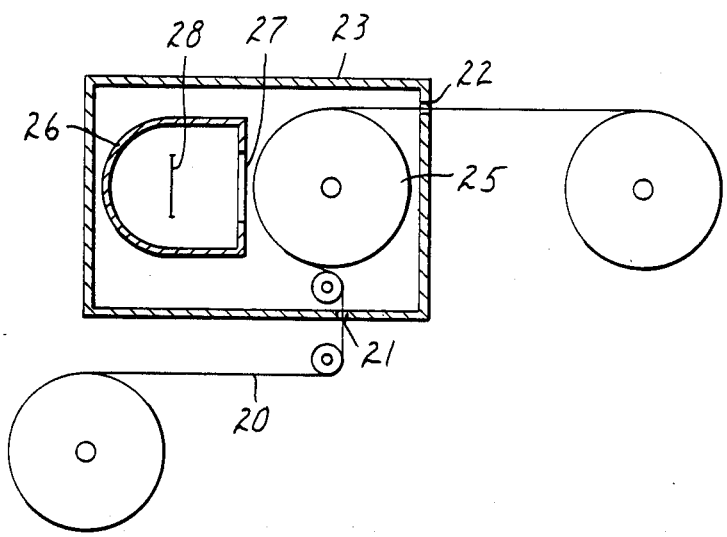
FIG. 2 schematically illustrates another apparatus for applying the adhesion-treatment of the invention.

In FIG. 2, a roll of polyester film base 20 is transported through slits 21 and 22 of a chamber 23 and around a chrome-plated steel chill roll 25 mounted in the chamber. While in contact with the chill roll, the film is irradiated through a metallic foil window 27 of an electron-beam apparatus 26 which contains a series of small parallel filaments, one 28 of which is shown.

EXAMPLE 1

A long roll of biaxially-oriented poly(ethylene terephthalate) film base having a width of 10 cm and a thickness of 75 micrometers was transported at substantially atmospheric pressure at 12 m/min. through apparatus similar to that shown in FIG. 1 and equipped with an ESI "Electrocurtain" electron-beam apparatus having a width of 17.8 cm. The distance from the window to the film base was about 2.5 cm. Dry nitrogen containing about 40 parts per million oxygen was forced into the chamber at a rate of 0.36 m³/min. The apparatus was operated at an accelerating voltage of 175 keV to provide absorbed dosage levels of 2, 5, 8 and 10 Mrad.

Onto each face of treated polyester film base, of Example 1, a magnetizable coating was applied by rotogravure from organic solvent and heated to provide a dried layer about 3.6 micrometers in thickness. Each magnetizable layer comprised 66% by weight of acicular iron oxide particles having an average thickness of 0.1 micrometer and an aspect ratio of about 8:1. The binder comprised polyurethane elastomer, phenoxy resin and other ingredients substantially as described in the Comparative Example of U.S. Pat. No. 4,210,703.

After the binder had cured, each magnetizable layer of each tape was tested in comparison to otherwise identical tapes except for omission of the electron-beam treatment. In one test, each magnetizable layer was adhered by room-temperature curing epoxy resin to an aluminum panel to create a bond stronger than the bond between the magnetizable layer and the polyester film base, and the force to peel back the tape at 180° was measured. In that test, each tape of Example 1 having a polyester film base showed far better adhesion than did tapes employing unirradiated polyester film base. In another test, the magnetizable layer of each tape having a polyester film base of Example 1 showed far better resistance to scratching with one's fingernail, except that tape made after a dosage of 2 Mrad was marginally acceptable. Also, each tape having a polyester film base of Example 1 showed far better resistance to removal of the magnetizable layer when it was moved while lightly pressing a razor blade at 90° against the layer, except that tape made after a dosage of 2 Mrad was only marginally better.

EXAMPLE 2

The magnetizable layers tested as reported in Example 1 were applied to polyester film base within a week after the novel adhesion-promoting treatment. Other portions of the film base were stored for several months in air at ordinary room temperatures before being coated. Partial testing showed equally good results.

When Example 1 was partially repeated at lower oxygen levels in the nitrogen atmosphere, better scratch resistance and better resistance to 180° peel were obtained.

EXAMPLE 3

Polyester film base identical to that used in Example 1 was transported at substantially atmospheric pressure through the apparatus of FIG. 2 at a speed of 30 m/min. with the chill roll maintained at about 8° C. The apparatus included a RPC Industries "Broad-Beam" electron-beam device which as a titanium foil window and contains a series of small parallel filaments and was operated at an accelerating voltage of 200 keV to provide absorbed dosages of 2, 5 and 8 Mrad. Dry nitrogen containing 10 parts per million oxygen was forced into the chamber during the irradiation.

Magnetizable layers were applied to both faces of each film base as in Example 1. The dried thickness of each layer was about 2.5 micrometers. In every case, the magnetizable layers on the face which contacted the chill roll exhibited poor scratch resistance and poor resistance to 180° peel. The other magnetizable layers exhibited better scratch resistance and resistance to 180° peel, with marginal improvement in tape made after a dosage of 2 Mrad. As compared to values reported for Example 1, the peel adhesion values for the layers on the faces toward the beam were lower, probably due in part to their lesser thicknesses.

EXAMPLES 4-6

A long roll of biaxially-oriented poly(ethylene terephthalate) film base having a width of 10 cm and a thickness of 35 micrometers was transported at 7.6 m/min. through apparatus similar to that shown in FIG. 2 and equipped with an ESI "Electrocurtain" electron-beam apparatus having a width of 30.5 cm. Dry nitrogen containing about 20 parts per million oxygen was forced into the chamber at a rate of 0.6 m³/min. The apparatus was operated at an accelerating voltage of 250 keV to provide absorbed dosage levels of 3, 5 and 10 Mrad. Film base so treated, together with a non-irradiated control (0 Mrad), were each coated on one side with an addition-cure release silicon which was compounded and applied as follows:

To 100 grams of a vinyl-terminated linear polydimethylsiloxane having a viscosity of 350 cps at 25° C. (see, e.g., U.S. Pat. No. 4,386,135) was added 0.07 g of a neutralized chloroplatinic acid catalyst containing 15 wt-% platinum (see, e.g., U.S. Pat. No. 3,715,334), yielding 100 parts platinum per million parts by weight of polydimethylsiloxane. The catalyzed siloxane was stirred 5 minutes. To it was added 0.25 g of 2-ethylhexyl hydrogen maleate polymerization inhibitor, and the mixture was stirred 15 minutes. Next there was added 2.5 g of a linear polymethylhydrosiloxane crosslinker, available as DC-1107 from Dow Corning Corporation. The resultant blend was stirred 15 minutes, and then coated onto the film base with a 3-roll differential-speed offset-gravure coater, the coating being applied to the side of the film base which faced the electron source during the irradiation step. Curing for 60 seconds at 150° C. in a circulating air oven produced an addition-cure silicone release liner from which a pressure-sensitive adhesive layer can be cleanly peeled.

Anchorage to the polyester film base of the silicone coating of each silicone release liner was rated by rubbing vigorously with the thumb. Silicone coatings which could not be removed by such abrasion were given an arbitrary rating of "5"; those which were readily removed were rated "1". Intermediate ratings were assigned to coatings having intermediate levels of resistance to removal. Testing was repeated after storing the silicone release liner in air at ordinary room temperatures for the times indicated in Table A.

TABLE A

| Example | Dosage (Mrad) | Initial | 1 week | 2 weeks | 8 weeks | 14 weeks | 6 months |
|---------|---------------|---------|--------|---------|---------|----------|----------|
| 4 | 3 | 5 | 4 | 4 | 4 | 4 | 4 |
| 5 | 5 | 5 | 4 | 4 | 4 | 4 | 4 |
| 6 | 10 | 5 | 4 | 4 | 3 | 4 | 4 |
| Control | 0 | 5 | 2 | 1 | 1 | 1 | 1 |

(Rating after storage for)

A silicone release liner rated below "3" is judged to have insufficient abrasion resistance for practical reuse. It is believed that prior to the present invention, there was no adhesion-promoting treatment for a polyester film base to provide a solvent-free addition cure silicone release liner that would rate 3 or higher after being stored for several weeks in air at ordinary room temperature.

EXAMPLE 7

The process of Examples 4–6 was repeated at an absorbed dosage level of 5 Mrad, except that after curing the silicone coating, an identical silicone coating was applied to the other face of the polyester film base and then cured in the same way, thus producing a double-faced silicone release liner. The coating on each face was rubbed vigorously with the thumb and its resistance to such abrasion was rated from "1" to "5" as in Examples 4–6, both immediately after testing and after storing the silicone release liner at ordinary room temperatures for 18 days. Results are reported in Table B.

TABLE B

| Side of film base | Rating | |
|---|---|---|
| | Initial | After 18 days |
| that faced beam | 4–5 | 4 |
| away from beam | 4–5 | 4 |
| control | 5 | 1–2 |

EXAMPLES 8–10

Pieces of biaxially-oriented poly(ethylene terephthalate) film base, each having a width of 15 cm, a thickness of 100 micrometers, and a length of approximately 60 cm, were irradiated as in Examples 4–6 except at dosages of 2, 5 and 10 Mrad. Each irradiated piece, along with a non-irradiated control (0 Mrad), was cut into strips 1.3 cm wide by 20 cm long. Onto rigid 2.5 cm×15 cm aluminum panels was spread a thin coating (about 50 micrometers) of a thermally-curable, two-part epoxy resin adhesive. Each strip was laid against a coating with approximately 5 cm of the film overhanging the end of the panel. The edge of a razor blade was scraped across each strip three times to insure good contact to the epoxy adhesive, after which the epoxy coating was allowed to cure for two days at room temperature.

After curing, each aluminum panel was attached to the moving platform of an Instrumentors Slip-Peel tester equipped with a 90° peel testing unit. The overhanging edge of the strip was attached to the force transducer of the instrument. With the platform moving away from the transducer at a rate of 15.2 cm/min, the force required to peel the strip away from the aluminum panel at a 90° angle was recorded. Results are tabulated in Table C.

TABLE C

| Example | Dosage (Mrad) | Adhesion (N/100 mm) |
|---|---|---|
| 8 | 2 | >93 |
| 9 | 5 | >77 |
| 10 | 10 | >100 |
| Control | 0 | 0.8 |

In all cases of the irradiated samples, the force required to separate the strip from the aluminum panel was greater than the strength of the strip itself, resulting in tearing of the film. Therefore, their adhesion was greater than values reported in Table C.

EXAMPLES 11–15

Pieces of biaxially-oriented poly(ethylene terephthalate) film base, each having a width of 30 cm, thickness of 100 micrometers and length of approximately 60 cm, were irradiated as in Examples 4–6 except at dosages of 1, 2, 5, 10 and 20 Mrad. Each piece, along with a non-irradiated control, was knife-coated at a thickness of 50 micrometers with a resin consisting of 70 parts (by weight) of a polyester-urethane acrylate, 29 parts of trimethylene glycol dimethacrylate and 1 part of 2,2-dimethoxy-2-phenylacetophenone photoinitiator. The coatings were cured by passing the samples under two high-pressure mercury lamps in a nitrogen atmosphere.

A 1.3 cm×20 cm strip was cut out of each sample, and an epoxy adhesive was used to adhere the coated side to a rigid aluminum panel as described in Examples 8–10. After complete cure of the epoxy adhesive, the panels were subjected to the 90° peel adhesion test described in Examples 8–10. Averages of two tests are reported in Table D.

TABLE D

| Example | Dosage (Mrad) | Adhesion (N/100 mm) |
|---|---|---|
| 11 | 1 | 3 |
| 12 | 2 | 34 |
| 13 | 5 | 31 |
| 14 | 10 | 26 |
| 15 | 20 | 42 |
| Control | 0 | 0.5 |

EXAMPLES 16 and 17

Pieces of biaxially-oriented poly(ethylene terephthalate) film base having a width of 15 cm, a thickness of 100 micrometers, and a length of approximately 150 cm, were irradiated as in Examples 4–6 except at dosages of 5 and 10 Mrad. The pieces were cut into 15×20 cm sections and dip-coated at 40° C. with a mixture consisting of 3 g of emulsion gelatin, 0.4 g of sodium dioctylsulfosuccinate, 0.2 ml of 1 N hydroxide, 3 ml of ethanol, and 47 ml of water. Also dip-coated were a non-irradiated control and conventional photobase which had been subbed with gelatin over a polyvinylidene chloride primer. Each dip-coating was dried overnight at room temperature to a thickness of about 12 micrometers.

Against each dried dip-coating was pressed a 1.9 cm×10 cm strip of an aggresively pressure-sensitive adhesive tape, leaving a 2 cm pull tab. Using a razor blade, a cut was made in the dip-coating close to the pull-tab and the tape was quickly pulled away at an angle of about 90°. The coating adhesion was considered to fail if the tape removed any part of the emulsion. Results are reported in Table E.

TABLE E

| Example | Dosage (Mrad) | Result |
|---|---|---|
| 16 | 5 | Pass |
| 17 | 10 | Pass |
| Control | 0 | Fail |
| Subbed control | — | Fail |

EXAMPLE 18

Biaxially-oriented poly(ethylene terephthalate) film base having a width of 15 cm, a thickness of 100 micrometers, and a length of 30 cm was irradiated as in Examples 4–6 except at an accelerating voltage of 224 keV to provide a dosage of 5 Mrad. This and a non-irradiated control were cut into 8 cm×20 cm strips and coated using a wire-wound rod with a mixture of 11.2 g phenol-formaldehyde resin, 4.6 of a synthetic shellac, and 0.25 g of a wetting agent. The coatings were allowed to cure in an oven for two days at approximately 80° C.

The coated samples were cut into 1.3 cm×20 cm strips and subjected to the 90° peel adhesion test described in Examples 8–10. The results are reported in Table F.

TABLE F

| Dosage (Mrad) | Adhesion (N/100 mm) |
|---|---|
| 5 | 10.7 |
| 0 | 2.3 |

When scratched with a blunt spatula, the coating on the non-irradiated control was easily removed, whereas the coating on the treated sample of this Example 14 was very tightly bound to the film base. Repeated scratching with the spatula would not separate the coating from the film. Ultimately, attempts to remove the coating in this manner resulted in tearing of the polyester film base itself.

Attempts to separate the coatings by flexing the backing fractured and removed the phenolic coating of the control sample and also fractured the coating of the treated sample of this Example 14, but it remained tightly bound to the film base.

We claim:
1. Method for coating a polyester film base with a curable organic coating, which method comprises the steps of:
   (1) continuously passing uncoated polyester film base, consisting essentially of saturated polyester, through an inert atmosphere containing less than 100 ppm oxygen while;
   (2) exposing the film base to irradiation by an electron beam to subject the film base to an absorbed dosage of at least 1 Mrad; and
   (3) applying a curable organic coating to the surface of the polyester film base;
whereby the polyester film, after step (2), has been rendered substantially more adherent to organic coatings than such film which has not been so treated, and this greater adherence lasts for prolonged periods, of at least one week, during storage at room temperature in air.

2. Method as defined in claim 1 wherein the dosage is from 1 to 20 Mrad.

3. Method as defined in claim 2 wherein the dosage is from 5 to 10 Mrad.

4. Method as defined in claim 1 wherein the inert atmosphere is substantially nitrogen.

5. Method as defined in claim 1 wherein the inert atmosphere contains less than 40 ppm oxygen.

6. Method as defined in claim 5 wherein the polyester film is at approximately atmospheric pressure during steps (1) and (2).

7. Method as defined in claim 1 wherein the polyester film base is continuously irradiated in step (2) at a web speed of at least 50 meters per minute.

8. Method as defined in claim 1 wherein the polyester is poly(ethylene terephthalate).

9. Method as defined in claim 8 wherein the film base is unsupported while being irradiated in step (2), and the adhesion of organic coatings to both faces of the film base is enhanced.

10. Method as defined in claim 8 wherein the polyester film base is cooled by a metal surface while being irradiated in step (2), and adhesion to only the noncontacting face of the film base is satisfactorily enhanced.

11. Method as defined in claim 1 wherein step (3) is followed by step (4) curing the curable organic coating, and wherein adhesion of the cured coating to the polyester film base has been enhanced by virtue of steps (1) and (2).

12. Method as defined in claim 11 wherein the curable organic coating is applied in step (3) to the surface of the film base which faced the electron-beam radiation in step (2).

13. Method as defined in claim 11 wherein the curable organic coating applied in step (3) is an adhesive.

14. Method as defined in claim 13 wherein said adhesive uncured epoxy adhesive which is cured to a resin after coating it onto the polyester film base.

15. Method as defined in claim 13 wherein two sections of polyester film base are adhered together by the adhesive cured in step (4), the adhesion of each of said sections of polyester film having been promoted by steps (1) and (2).

16. Method as defined in claim 15 wherein said two sections of polyester film base are at opposite ends of a rectangular piece of polyester film base, thus providing an endless belt.

17. Method as defined in claim 11 wherein the curable organic coating is an imaging coating.

18. Method as defined in claim 11 wherein the curable organic coating contains inorganic particles.

19. Method as defined in claim 18 wherein the inorganic particles are abrasive particles.

20. The method of claim 1 wherein the electron beam radiation has an accelerating voltage of at least 150 keV.

21. The method of claim 1 wherein the film base is biaxially oriented polyester.

22. The method of claim 1 wherein the curable organic coating is selected from the group consisting of phenoxy resins, polyurethanes, addition cure silicones, epoxy adhesives, and phenol—formaldehyde resins.

* * * * *

UNITED STATES PATENT AND TRADEMARK OFFICE
CERTIFICATE OF CORRECTION

PATENT NO. : 4,594,262
DATED     : June 10, 1986
INVENTOR(S) : Curtis L. Kreil, LuAnn Sidney It is certified that error appears in the above-identified patent and that said Letters Patent is hereby corrected as shown below:

In column 8, line 35 --1 N hydroxide-- should be --1 N sodium hydroxide--

Signed and Sealed this

Twenty-sixth Day of August 1986

[SEAL]

Attest:

DONALD J. QUIGG

Attesting Officer

Commissioner of Patents and Trademarks